(12) United States Patent
Tojo

(10) Patent No.: US 10,506,174 B2
(45) Date of Patent: Dec. 10, 2019

(54) INFORMATION PROCESSING APPARATUS AND METHOD FOR IDENTIFYING OBJECTS AND INSTRUCTING A CAPTURING APPARATUS, AND STORAGE MEDIUM FOR PERFORMING THE PROCESSES

(71) Applicant: CANON KABUSHIKI KAISHA, Tokyo (JP)

(72) Inventor: Hiroshi Tojo, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 15/057,408

(22) Filed: Mar. 1, 2016

(65) Prior Publication Data

US 2016/0261808 A1  Sep. 8, 2016

(30) Foreign Application Priority Data

Mar. 5, 2015 (JP) .................. 2015-043872

(51) Int. Cl.
*H04N 7/18* (2006.01)
*H04N 5/247* (2006.01)
*G06K 9/00* (2006.01)
*H04N 5/232* (2006.01)
*H04N 5/235* (2006.01)

(52) U.S. Cl.
CPC ......... *H04N 5/247* (2013.01); *G06K 9/00771* (2013.01); *H04N 5/2353* (2013.01); *H04N 5/23203* (2013.01); *H04N 5/23206* (2013.01); *H04N 5/23229* (2013.01)

(58) Field of Classification Search
CPC ............... H04N 5/247; H04N 5/23203; H04N 5/23229; H04N 5/2353; G06K 9/00771
USPC .......................................... 348/169
See application file for complete search history.

(56) References Cited

U.S. PATENT DOCUMENTS

| 9,230,250 B1 * | 1/2016 | Parker .................. G06Q 20/203 |
| 9,672,627 B1 * | 6/2017 | Ramaswamy .......... G06T 7/292 |
| 2006/0192660 A1 * | 8/2006 | Watanabe ................ B60R 1/00 340/435 |

(Continued)

FOREIGN PATENT DOCUMENTS

| JP | 2004266404 A | 9/2004 |
| JP | 2007036615 A | 2/2007 |
| JP | 2009-265922 A | 11/2009 |

OTHER PUBLICATIONS

Stauffer et al., "Adaptive background mixture models for real-time tracking", IEEE Computer Society Conference on Computer Vision and Pattern Recognition, Cat. No. PR00149, IEEE Comput. Soc. Part vol. 2, 1999, pp. 1-7.

(Continued)

*Primary Examiner* — Richard T Torrente
(74) *Attorney, Agent, or Firm* — Carter, DeLuca & Farrell LLP

(57) ABSTRACT

In order to restrain both a deterioration of identification of objects captured by respective capturing apparatuses connected via a network and an increase of a load of the network, a frame rate of the capturing apparatus (proximity camera) is raised according a timing when a person to be captured by the one capturing apparatuses is captured by the other capturing apparatus of performing the capturing next to the one capturing apparatus.

8 Claims, 6 Drawing Sheets

(56) References Cited

U.S. PATENT DOCUMENTS

| | | | |
|---|---|---|---|
| 2006/0197839 A1* | 9/2006 | Senior | H04N 5/232 348/169 |
| 2007/0237387 A1 | 10/2007 | Avidan et al. | |
| 2010/0277613 A1* | 11/2010 | Seki | G11B 20/1262 348/231.2 |
| 2013/0265332 A1* | 10/2013 | Miyakawa | G06T 19/006 345/633 |
| 2015/0229889 A1* | 8/2015 | Boettiger | H04N 9/09 348/262 |
| 2015/0279049 A1 | 10/2015 | Tojo et al. | |

OTHER PUBLICATIONS

Layne et al., "Towards Person Identification and Re-Identification With Attributes", In Proc. ECCV, 2012, pp. 1-10.
Chen et al., "An Adaptive Learning Method for Target Tracking across Multiple Cameras", CVPR, 2008, pp. 1-8.
U.S. Appl. No. 14/994,271, filed Jan. 13, 2016, Inventor Hiroshi Tojo.
Japanese Office Action dated Dec. 18, 2018 in corresponding Japanese Patent Application No. 2015-043872, with English translation.

* cited by examiner

INFORMATION PROCESSING APPARATUS AND METHOD FOR IDENTIFYING OBJECTS AND INSTRUCTING A CAPTURING APPARATUS, AND STORAGE MEDIUM FOR PERFORMING THE PROCESSES

BACKGROUND OF THE INVENTION

Field of the Invention

The present invention relates to an information processing apparatus, an information processing method, and a storage medium which stores therein a program for performing the information processing method. Particularly, the present invention relates to a technique which is suitably used to chase an object by using plural capturing (or imaging) apparatuses.

Description of the Related Art

Conventionally, a technique of chasing a suspicious person or the like by receiving, via a network, images respectively captured (imaged) by plural cameras installed in a broad area such as shopping mall, an airport or the like, and analyzing the received images has been disclosed. For example, as the technique like this, there is the technique described in Japanese Patent Application Laid-Open No. 2009-265922. In Japanese Patent Application Laid-Open No. 2009-265922, the area of a person is detected from the image captured by each camera, the feature amounts of the color and the shape of clothes are obtained from the detected area, the obtained feature amounts are compared, and then it is identified based on the compared result whether or not the persons in the images captured by the respective cameras are the same person.

If the number of the cameras to be installed increases so as to be able to widely chase an object, the amount of the data to be flowed and exchanged on the network increases. Thus, if the number of the cameras is large, there is a case where it is difficult to obtain the images of a high frame rate from all the cameras due to a limitation of the network band. Therefore, in the case like this, for example, it is conceivable to capture the objects at a low frame rate by a part or all of the cameras. However, if the object is captured at the low frame rate, the number of times enabling to capture the object in a unit of time decreases. Therefore, a possibility that the object image optimum for extracting the feature amount can be obtained decreases. Moreover, there is a possibility that it becomes difficult to capture a running person or a moving object in itself.

Besides, it is conceivable to lower a bit rate (i.e., a transmission speed) of the data transmitted from a camera because of the limitation of the network band. However, if the bit rate of the data transmitted from the camera is low, there is a fear that obtained image quality deteriorates. Therefore, in such a case, even if the object has been captured, there is a fear that it is impossible to adequately detect the already captured object.

As above, in the method as described in Japanese Patent Application Laid-Open No. 2009-265922, there is a fear that it becomes impossible to chase an object because the relevant object cannot be identified sufficiently.

That is, in the above related art, it is not easy to reduce the load of the network while maintaining identification accuracy of the objects captured by the plural capturing apparatuses connected via the network.

The present invention, which has been completed in consideration of such problems as described above, aims to suppress both deterioration of identification accuracy of the objects captured by the respective capturing apparatuses connected via the network and an increase of the load of the network.

SUMMARY OF THE INVENTION

An information processing apparatus according to the present invention is characterized by comprising: a specifying unit configured to specify a second capturing apparatus which captures an image to be determined whether or not an object corresponding to an object included in an image captured by a first capturing apparatus is included; and a first outputting unit configured to output, to the second capturing apparatus, an instruction for raising at least either one of a capturing frame rate and an image quality of the second capturing apparatus.

According to the present invention, it is possible to suppress both deterioration of identification accuracy of the objects captured by the respective capturing apparatuses connected via a network and an increase of the load of the network.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
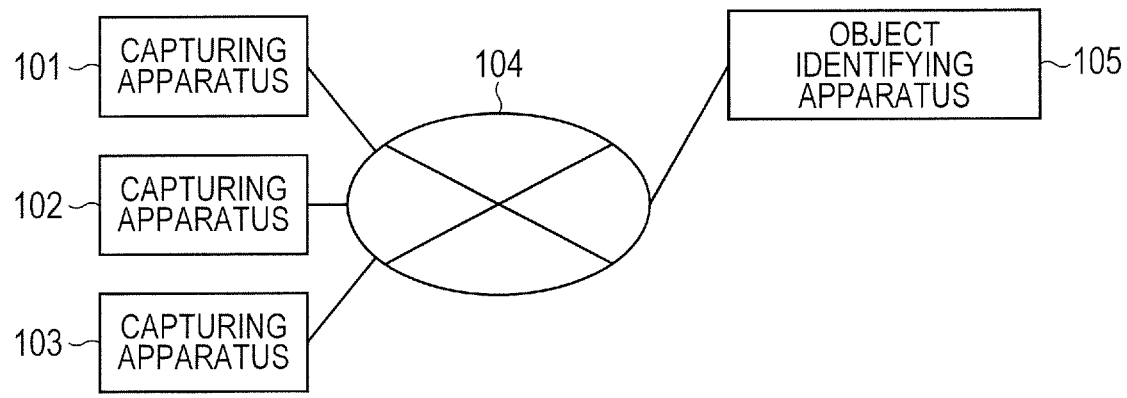
FIG. 1 is a diagram illustrating a configuration of a network camera system.

FIG. 1 is a diagram illustrating an example of the configuration of a network camera system.

Each of capturing apparatuses (cameras) 101 to 103 captures (images) a moving image as an image in a capturing (imaging) range. Each of the capturing apparatuses 101 to 103 transmits the captured image to an external information processing apparatus such as an object identifying apparatus 105 via a network 104. The object identifying apparatus 105 is the device which receives the image captured by each of the capturing apparatuses 101 to 103 via the network 104, and identifies the objects appearing in the images captured by the capturing apparatuses 101 to 103 based on the received images.

Figure 2:
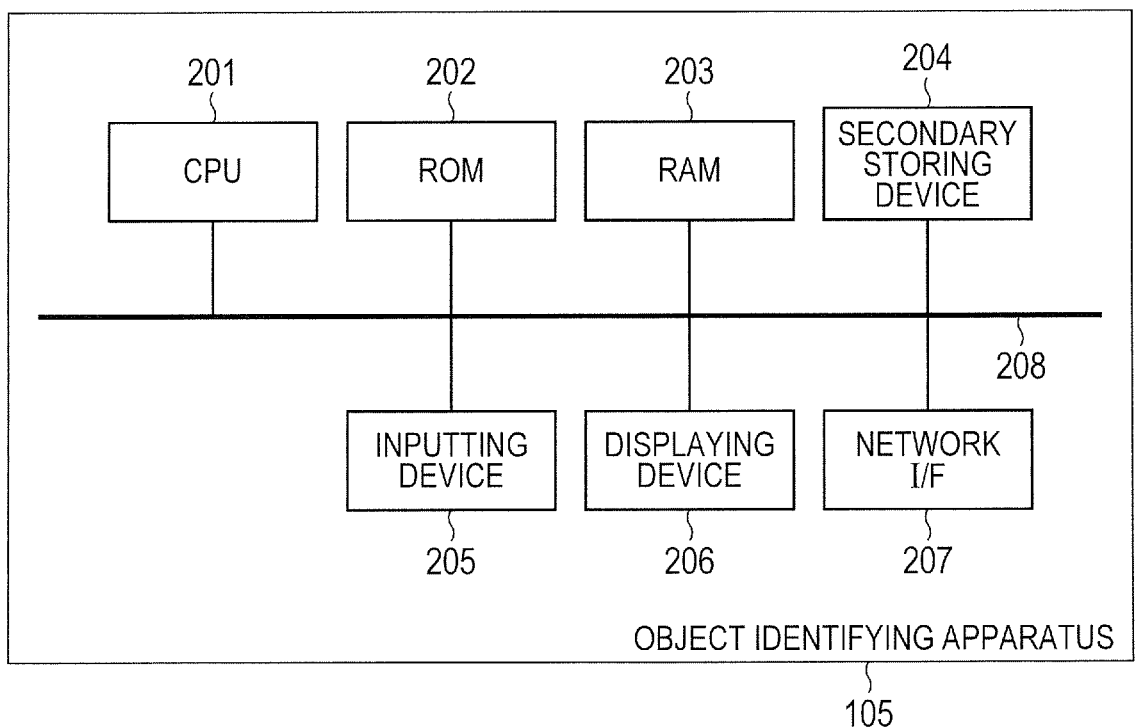
FIG. 2 is a block diagram illustrating the hardware constitution of an object identifying apparatus.

FIG. 2 is a block diagram, illustrating an example of the hardware constitution of the object identifying apparatus 105.

A CPU (central processing unit) 201 executes various instructions according to the programs stored in a ROM (read only memory) 202 and/or a RAM (random access memory) 203.

The ROM 202 is the nonvolatile memory which stores therein the programs for performing the processes according to later-described flow charts, the programs necessary for other control, and various data.

The RAM 203 is the volatile memory which stores therein temporary data such as frame image data, the result of object identification, and the like.

A secondary storage device 204 is the secondary memory such as a hard disk drive, a flash memory or the like of which the stored data can be rewritten. The secondary storage device stores therein image information, image processing programs, various setting contents and the like. Then, the stored information is transferred to the RAM 203, and the transferred information is used when the CPU 201 executes the program. Besides, the stored data is used as data.

An inputting device 205 is the keyboard, the mouse and the like which enable a user to input various information, data and instructions.

A displaying device 206 is the CRT (cathode ray tube), the liquid crystal display or the like which displays processed results and the like for the user.

A network I/F (interface) 207 is the modem, the LAN (local area network) or the like. The network I/F performs connection with a network such as the Internet, an intranet, or the like.

A bus 208 is used to communicably connect the respective function components of the object identifying apparatus 105 with others. Thus, the function components of the object identifying apparatus 105 mutually input and output data via the bus 208.

Applications operating on the operating system have been installed in the object identifying apparatus 105 having the above constitution.

Figure 3:
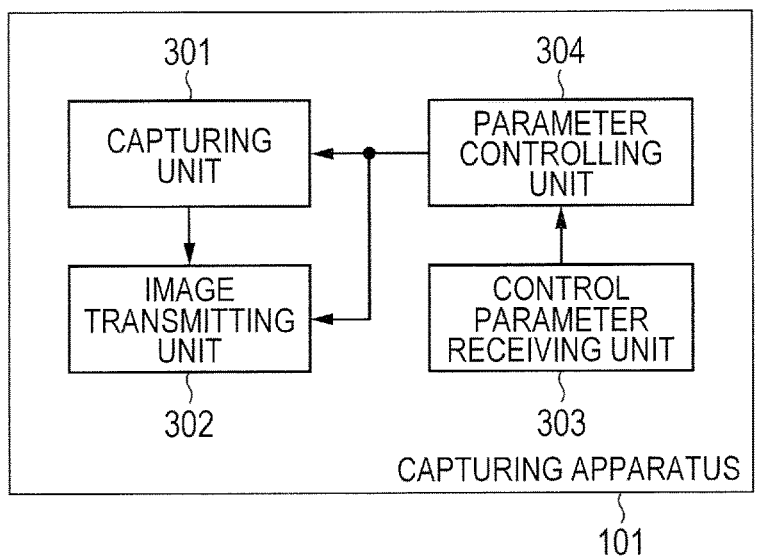
FIG. 3 is a block diagram illustrating the function constitution of a capturing apparatus.

FIG. 3 is a block diagram illustrating an example of the function constitution of the capturing apparatus 101. Since the capturing apparatuses 101 to 103 have the same function constitution, only the function constitution of the capturing apparatus 101 will be described here, whereas detailed descriptions of the function constitutions of the capturing apparatuses 102 and 103 are omitted.

A capturing unit 301, which has a capturing lens and a capturing sensor, captures the image. As the capturing sensor, for example, the CCD (Charge Coupled Device), the CMOS (Complementary Metal Oxide Semiconductor) sensor or the like can be enumerated.

An image transmitting unit 302 transmits the image captured by the capturing unit 301 to the object identifying apparatus 105 via the network 104. When the frame rate of the image to be transmitted by the image transmitting unit 302 is more increased, the band of the network 104 is more to be consumed.

A control parameter receiving unit 303 receives the control parameter, which was transmitted from the object identifying apparatus 105, via the network 104. Here, for example, a command of changing the parameter and a frame rate used in case of capturing the image by the capturing unit 301 are included in the control parameter. However, a parameter to be included in the control parameter is not limited to the frame rate used in case of capturing the image by the capturing unit 301. At least one of the following parameters may be included in the control parameter in addition to or instead of the frame rate used in case of capturing the image by the capturing unit 301. That is, any one of the shutter speed and exposure time in case of capturing the image by the capturing unit 301, the frame rate and bit rate used in case of transmitting the image by the image transmitting unit 302, and an image compression method may be included in the control parameter. The frame rate used in case of transmitting the image by the image transmitting unit 302 may be identical with the frame rate used in case of capturing the image by the capturing unit 301 or may be lower than the frame rate used in case of capturing the image by the capturing unit 301. In the latter case, for example, the image is to be transmitted by thinning out the captured frame images.

A parameter controlling unit 304 controls at least any one of the capturing unit 301 and the image transmitting unit 302 on the basis of the control parameter received by the control parameter receiving unit 303, Consequently, for example, the frame rate of the capturing unit 301 can be changed from 1 fps (the number of frames per second) to 30 fps.

Figure 4:
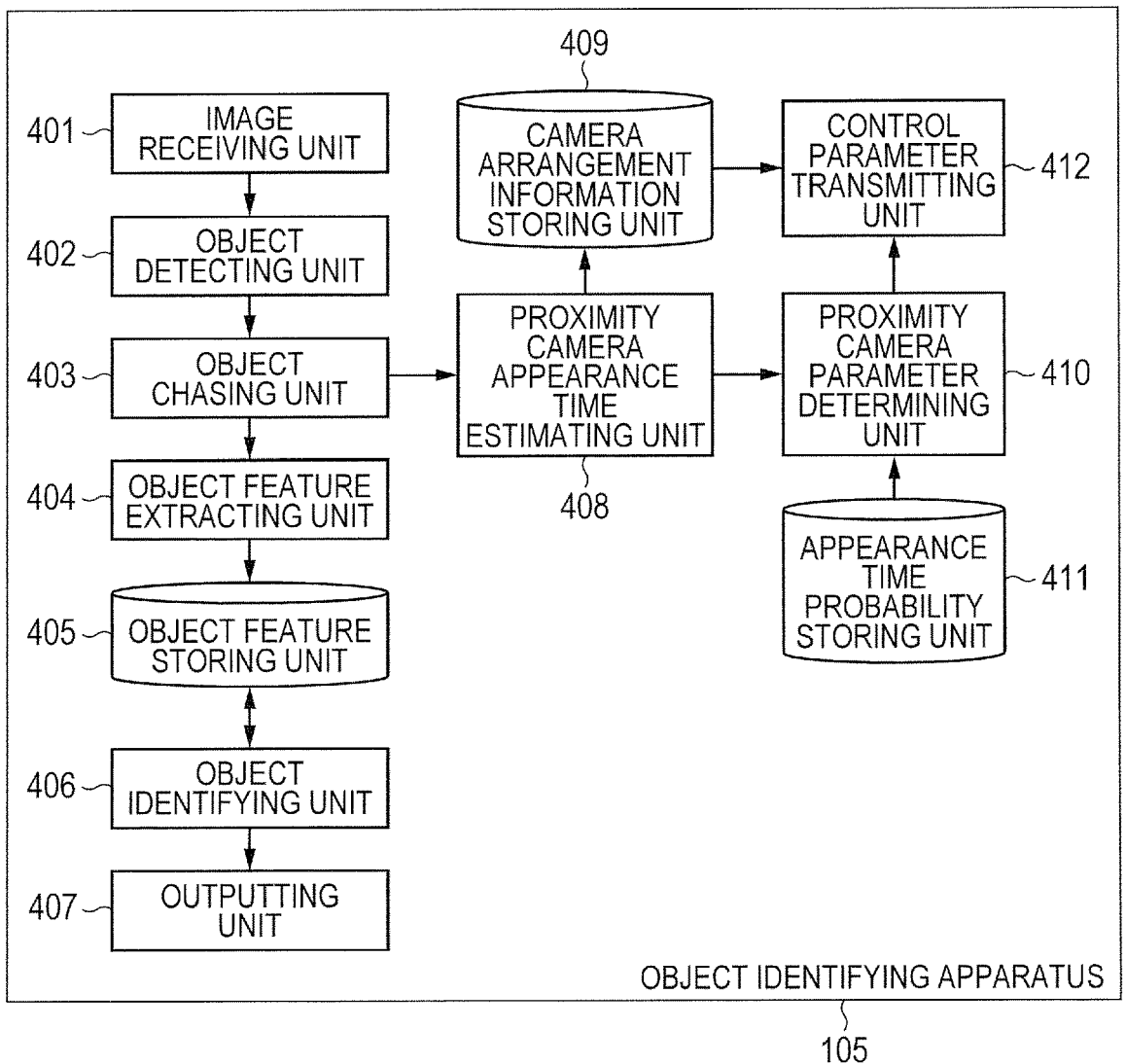
FIG. 4 is a block diagram illustrating an example of the function constitution of the object identifying apparatus.

FIG. 4 is a block diagram illustrating an example apparatus 105.

An image receiving unit 401 receives the images captured by the capturing apparatuses 101 to 103 via the network 104, The function of the image receiving unit 401 is realized by using, for example, the network I/F 207.

An object detecting unit 402 detects an area of the object from the image received by the image receiving unit 401. In the present embodiment, it will be described by exemplifying a case that the object targeted to be detected is a person. The function of the object detecting unit 402 is performed by using, for example, the CPU 201 and the ROM 202.

An object chasing unit 403 chases (or traces) the object, which was detected by the object detecting unit 402, in the image by mutually associating the area of the object, which was detected by the object detecting unit 402, existing in the current frame image with the area of the object which was previously detected by the object detecting unit 402. Consequently, a fact that how the object is moving in the screen can be obtained. The function of the object chasing unit 403 is performed by using, for example, the CPU 201 and the ROM 202.

An object feature extracting unit 404 extracts the feature amount of the object from the area of the object detected by the object detecting unit 402. As the feature amount of the object, for example, information such as clothing color, hair color, shapes of face organs, height of a person, a state of wearing or not wearing sunglasses, a state of wearing or not wearing mustache, a state of having or not having a bag, or the like can be adopted. The function of the object feature extracting unit 404 is performed by using, for example, the CPU 201 and the ROM 202.

An object feature storing unit 405 stores the feature amount of the object, which was extracted by the object feature extracting unit 404, by mutually associating a camera ID unique to the capturing apparatus, which captured the object, and the current time of day with the feature amount. The function of the object feature storing unit 405 is realized by using, for example, the RAM 203 or the secondary storing device 204.

An object identifying unit 406 matches the objects in the images captured by the capturing apparatuses 101 to 103 by reading out the feature amounts of the objects stored, during a predetermined time from the object feature storing unit 405 and then identifies the same object captured by the different capturing apparatuses. The function of the object identifying unit 406 is performed by using, for example, the CPU 201 and the ROM 202.

An outputting unit 407 provides information for a user by displaying the information concerning the object which was identified by the object identifying unit 406. The function of the outputting unit 407 is realized by using, for example, the displaying device 206.

A proximity camera appearance time estimating unit 408 predicts that the object to be chased by the object chasing unit 403 moves to an capturing range of which the capturing apparatus from the capturing range of the capturing apparatus which is capturing the object. This prediction is performed on the basis of camera arrangement information which is stored in a camera arrangement information storing unit 403 to be described later and the image which is currently captured by the capturing apparatus. Then, the proximity camera appearance time estimating unit 408 estimates the time required in appearing the object in the image to be captured by the capturing apparatus which captures the predicted capturing range. The function of the proximity camera appearance time estimating unit 408 is performed by using, for example, the CPU 201 and the ROM 202. In the following description, the capturing apparatus which is predicted to capture the object in the next of the capturing apparatus which currently captures the object is called a "proximity camera" in accordance with necessity.

The camera arrangement information storing unit 409 stores the camera arrangement information which indicates that how the capturing apparatuses 101 to 103 are arranged in a monitor target area. The function of the camera arrangement information storing unit 409 is realized by using, for example, the RAM 203 or the secondary storing device 204.

A proximity camera parameter determining unit 410 determines the frame rate of the proximity camera as an example of a parameter to be included in the control parameter on the basis of the appearance time probability stored in an appearance time probability storing unit 411 to be described later.

The appearance time probability storing unit 411 stores the appearance time probability. The appearance time probability is such the probability that the object is captured by the proximity camera after that the object appeared in the capturing range of the proximity camera at T hours later. The function of the appearance time probability storing unit 411 is realized by using, for example, the ROM 203 or the secondary storing device 204.

A control parameter transmitting unit 412 transmits the control parameter, which includes the frame rate determined by the proximity camera parameter determining unit 410 and the command of changing the parameter, to the proximity camera via the network 104. The function of the control parameter transmitting unit 412 is realized by using, for example, the network I/F 207.

Next, an example of the process to be performed by the object identifying apparatus 105 will be described.

Figure 5:
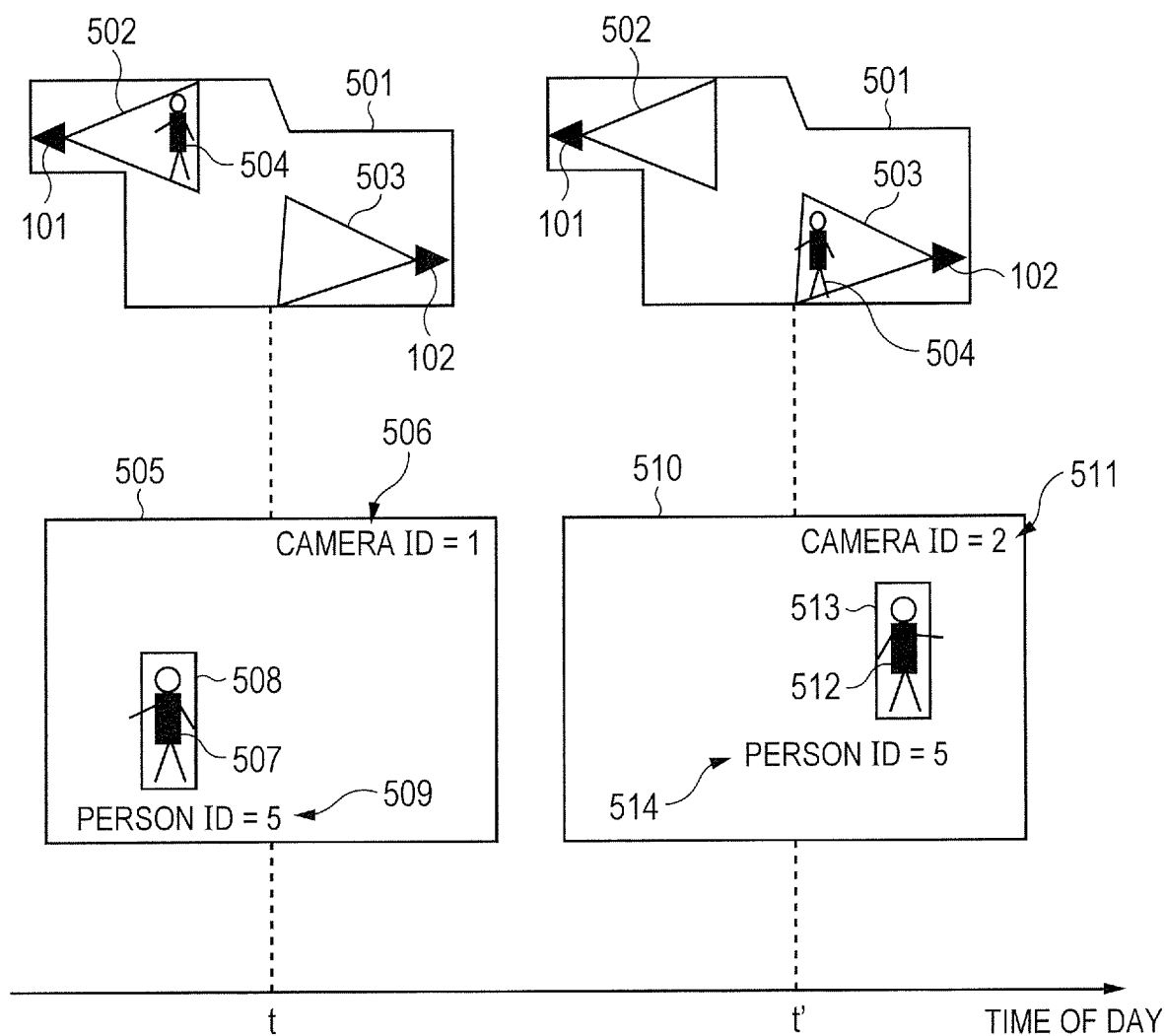
FIG. 5 is a diagram illustrating the positions of a person in a monitor target area and images including the relevant person.

FIG. 5 is a diagram conceptually illustrating an example of a position of the person in the monitor target area at a time of day t and the image including the relevant person and a position of the person in a monitor target area at a following time of day t' and the image including the relevant person. In FIG. 5, the position of the person in the monitor target area is indicated in the upper part and the image including the relevant person is indicated in the lower part. Incidentally, in FIG. 5, it will be described by exemplifying a case that, in the plural capturing apparatuses 101 to 103, the capturing apparatus 101 is the first capturing apparatus which previously captures the object and the capturing apparatus 102 is the second capturing apparatus which subsequently captures the object.

In an example illustrated in FIG. 5, the capturing apparatuses 101 and 102 are installed in a monitor target area 501. The capturing apparatuses 101 and 102 respectively capture the images in respective capturing ranges 502 and 503. A person 504 exists in the capturing range 502 of the capturing apparatus 101 at the time of day t.

An image 505 is such the image, which is at the time of day t, captured by the capturing apparatus 101. In the image 505, a camera ID 506 of the capturing apparatus 101 is displayed. In addition, a person 507 is included in the image 505 (that is, a person 504 in the real world is included as the image). In addition, a rectangular object area 508 and an object (person) ID 509 are displayed in the image 505. The object area 508 and the object ID 509 will be described later.

At the time of day t', the person 504 exists in the capturing range 503 of the capturing apparatus 102.

An image 510 is such the image, which is at the time of day t', captured by the capturing apparatus 102. Similar to the image 505, a camera ID 511 of the capturing apparatus 102 is displayed in the image 510. In addition, a person 512 is included in the image 510 (that is, the person 504 in the real world is included as the image). In addition, a rectangular object area 513 and an object (person) ID 514 are displayed, in the image 510.

An example of the process to be performed in the object identifying apparatus 105 when transmitting the control parameter to the proximity camera by detecting and chasing the person will be described with reference to a flow chart in FIG. 6. In an example indicated in FIG. 5, this process corresponds to such a process to be performed during a period from when the person 504 is captured by the capturing apparatus 101 until when the person 504 exits from the capturing range 502.

The image receiving unit 401 receives the images, which were captured by the capturing apparatuses 101 to 103, with a frame-image unit via the network 104 (S601). Incidentally, each of the capturing apparatuses 101 to 103 has a camera ID unique to the capturing apparatus. In addition, information of a time of day when the frame was obtained is given to the frame image as a frame ID used for specifying the frame. Each of the capturing apparatuses 101 to 103 mutually associates the camera ID and the frame ID with the frame image and transmits the frame image together with the camera ID and the frame ID. The object identifying apparatus 105 can discriminate whether the frame image corresponds to the image, which was captured by which the capturing apparatus and at which timing, by the camera ID and the frame ID associated with the received frame image.

Next, the object detecting unit 402 detects the object from the image which was received in S601 (S602).

As a specific method of detecting the object, for example, there is a method according to the background difference, (Refer to Stauffer C, Crimson W. E. L. Adaptive background mixture models for real-time tracking. In Proceedings. 1999 IEEE Computer Society Conference on Computer Vision and Pattern Recognition (Cat. No PR00149.). IEEE Comput. Soc. Part Vol, 2, 1999). This method is such a method, where a background model is previously generated from the image, in which only the background is captured, and the difference between this background model and the input image is calculated and then the object is detected from the calculated result.

Additionally, as a method of detecting the object, for example, there is a method described in the specifications of the U.S. Patent Application Publication No. 2007/0237387, in this method, a predetermined sized detection window is scanned on the input image, and it is discriminated whether or not the object, is a person for the pattern image obtained by cutting out the image which is in the detection window. A discriminator is constituted by effectively combining a lot of weak discriminators by use of the AdaBoost (Adaptive Boosting), thereby improving accuracy of the discrimination. In addition, the discriminators are connected in series to constitute a cascade detector. The weak discriminator performs the discrimination by treating the HOG (Histograms of Oriented Gradients) feature amount as an input. Then, the cascade detector first eliminates a candidate, of which the pattern is not obviously the object, immediately by using a former-stage simple discriminator. Then, it is discriminated whether or not the object is a person for only the other candidate by using a latter-stage complex discriminator having the higher discriminating performance.

Incidentally, in the present embodiment, although it has been described by exemplifying a case that the object targeted to be detected is a person, another object other than the person can be also applied. For example, in case of treating a vehicle as the object, a discriminator described in the specifications of the U.S. Patent Application Publication No. 2007/0237387 may be produced for the vehicle.

The object detecting unit 402 can detect an object area from the image received in S601 by the above-described method.

For example, coordinates of which the origin is placed on an upper left corner in the frame image are determined, and the object area is expressed by the X-coordinates and the Y-coordinates of two points placed on an upper left corner and a lower right corner of a rectangle which surrounds the person. In addition, the object detecting unit 402 creates a mask image, where pixels corresponding to the person in the rectangular-object area are expressed by "1" and other pixels are expressed by "0", and the mask image may be given to information of the object area. By using the mask image, pixels other than the person, which are to be included in the object area by expressing the object area by the rectangle, can be distinguished from the pixels of the person.

Next, the object chasing unit 403 performs a chasing process of the object (S603). The chasing process of the object is such a process, where it is obtained that the object detected in the current frame image corresponds to which the object detected in the one previous frame image. As the chasing process of the object, there are various methods. For example, as a method of the chasing process of the object, there is such a method of associating the object area, which is included in the one previous frame image, with the object area, which is included in the current frame image, of which the respective central positions have the shortest distance between them. Other than this method, as a method of the chasing process of the object, there is a method of performing the pattern matching between the one previous frame image and the current frame image by treating the object area of the one previous frame image as the matching pattern, The chasing process of the object may be any method if the objects between the frame images can be associated with each other.

The object chasing unit 403 gives the object ID, which indicates that the person in the current frame image is the same person in the previous frame image, to the frame image received in S601 as a result of the above-described chasing process of the object. That is, the object chasing unit 403 associates the ID, which is the same as the object ID for specifying the person detected in the one previous frame image, with the frame image received in S601. The object chasing unit 403 outputs information of the object area mutually associated with the camera ID and the object ID to the object feature extracting unit 404.

Next, the object feature extracting unit 404 extracts the feature amount of the object from, the object area (S604) and stores the extracted feature amount of the object in the object feature storing unit 405 (S605).

As the feature amount of the object, color, brightness, edge and the like extracted from the object area can be enumerated.

In addition, the feature meaningful for the person indicating a state of having or not having a bag, a state of wearing or not wearing sunglasses, a state of wearing or not wearing mustache, or the like may be extracted as the feature amount of the object. For example, the above feature amount can be indicated, by values in a range from "0" to "1". For example, as for the state of having or not having the bag, the value "0" indicates the state of not having the bag and the value "1" indicates the state of having the bag. There is also a case that the state of having or not having the bag cannot be determined from only the image. Therefore, an intermediate value such as "0.5" can be also taken as the feature amount of the object.

As the feature amount, the LBP (Local Binary Pattern) feature amount or the HCG feature amount indicating the shape feature or the texture feature amount extracted by using a Gabor filter or a Schmid filter can be used. A discriminator, which discriminates the feature amount corresponding to the correct answer from the feature amount not corresponding to the correct answer in a feature amount space, is created by using a lot of images with correct answers and then the feature amount can be determined. As for the discriminatory a method such as the support vector machine (SVM) or the like can be enumerated. (Refer to R. Layne, T. M. Hospedales, and S. Gong, "Towards Person Identification and Re-Identification With Attributes," In Proc. ECCV, 2012), The object feature extracting unit 404 associates the camera ID, the object ID and information of the object area with the feature amount of the object extracted as above. When plural kinds of the feature amounts are extracted as the feature amounts of the one object, the object feature extracting unit 404 associates an object attribute ID which discriminates the kind of the feature amount, with the respective feature amounts. Accordingly, for example, it can be decided (or determined) whether or not the object, is the same object by comprehensively considering the respective feature amounts in S807 of FIG. 8 to be described later.

Next, the object chasing unit 403 decides (or determines) whether or not the object exited from the capturing range of the capturing apparatus which currently captures the object (S606). In an example illustrated in FIG. 5, the object chasing unit 403 decides whether or not the person 504 exited from the capturing range 502 of the capturing apparatus 101.

Figure 7:
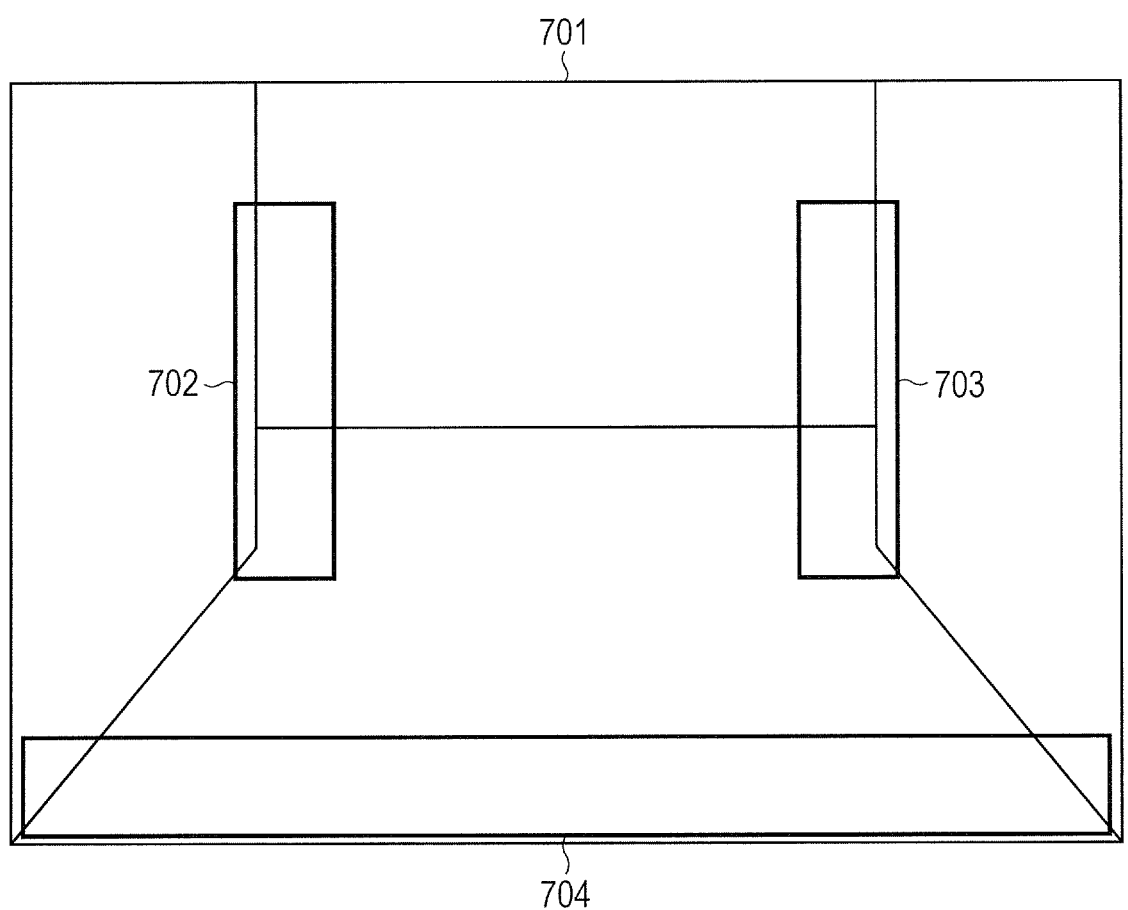
FIG. 7 is a diagram illustrating entrance and exit points.

Here, entrance and exit points within the frame image will be described. FIG. 7 is a diagram conceptually illustrating an example of entrance and exit points set within the image. In FIG. 7, an image 701 is such the image to be captured by the capturing apparatus which is installed in a T-shaped corridor in the building. This capturing apparatus is faced to the direction branching to the left and right sides at the end of the T-shaped corridor. Here, places to be supposed such the places, where the object enters into the capturing range of the capturing apparatus and exits from the capturing range, are called the entrance and exit points. In an example illustrated in FIG. 7, a left area 702 at the end of the T-shaped corridor, a right area 703 at the end of the T-shaped corridor and an area 704 in front of the corridor are the entrance and exit points. The entrance and exit points are set in the object identifying apparatus 105 by previously designating by a user when installing the capturing apparatuses 101 to 103.

From a result of the chasing process of the object performed in S603, it is assumed that the object reaches the entrance and exit points within the frame image in the one previous frame image and the object is not detected, in the current image frame. In this case, the object chasing unit 403 decides that the object exited from the capturing range of the capturing apparatus which, currently captures the object.

As a result of this decision, when the object exited from the capturing range of the capturing apparatus which currently captures the object, the flow advances to S607. On the other hand, when the object does not exit from the capturing range of the capturing apparatus which currently captures the object, the flow returns to S601. Then, processes from S601 to S606 are repeated until it is decided that the object exited from the capturing range of the capturing apparatus which currently captures the object.

Next, the proximity camera appearance time estimating unit 408 specifies the capturing apparatus (proximity camera) to be predicted to capture the object next to the capturing apparatus which currently captures the object (S607). That is, the proximity camera appearance time estimating unit 408 specifies the second capturing apparatus which captures the image to be decided whether or not the object corresponding to the object included in the image captured by the first capturing apparatus is included.

Camera arrangement information is previously stored in the camera arrangement information storing unit 409. As described above, the camera arrangement information is such the information which indicates that how the capturing apparatuses 101 to 103 are arranged in the monitor target area. Specifically, the camera arrangement information includes, for example, a camera ID, a default frame rate of the capturing apparatus, an entrance and exit, points ID for discriminating the entrance and exit points in the capturing apparatus, a proximity-camera ID corresponding to each the entrance and exit points ID and a distance from the capturing apparatus to the proximity camera. The proximity camera ID corresponding to the entrance and exit points ID is such the camera ID of the capturing apparatus (proximity camera) which captures the capturing range to be passed next by the object, after the object exited the capturing range from the entrance and exit points.

For example, the distance from the each capturing apparatus to the proximity camera is a distance of the route obtained by joining the predetermined position in the capturing range of the capturing apparatus (e.g., positions of the entrance and exit points for the capturing apparatus) and the predetermined position in the capturing range of the proximity camera (e.g., positions of the entrance and exit points for the proximity camera). As the distance of this route, for example, a previously measured value may be used or a value approximated by the straight line distance or the like may be used. In this manner, the distance from the each capturing apparatus to the proximity camera is previously set in the object identifying apparatus 105 by the user when installing the capturing apparatuses 101 to 103.

The proximity camera appearance time estimating unit 408 specifies the proximity camera ID on the basis of the entrance and exit points, where the object passed when the object exited from the capturing range, with reference to the above-described camera arrangement information.

Next, the proximity camera appearance time estimating unit 408 estimates the appearance time which is such the time to be required in that the object appears in the proximity camera (S608). In the present embodiment, the proximity camera appearance time estimating unit 408 estimates the time, which is required in that the object appears in the proximity camera, as the appearance time from the time from when the object exits from the capturing range of the capturing apparatus until when the object reaches the predetermined position in the capturing range of the proximity camera. As the predetermined position in the capturing range of the proximity camera, for example, the entrance and exit points, where the object first passes after that the object exited from the capturing range of the capturing apparatus which was capturing the object, can be enumerated among the entrance and exit points in the proximity camera.

First, the proximity camera appearance time estimating unit 408 calculates the movement speed of the object from a result of the chasing process of the object performed in S603. Specifically, the movement speed of the object can be obtained by the calculation that the movement distance of the center-of-gravity position of the object in the screen (with a pixel unit) between the frame images is divided by the time between the frame images. Note that the time between the frame images can be obtained by the frame rate. While the object is being chased, plural movement speeds are to be obtained as the movement speed of the object. Therefore, the proximity camera appearance time estimating unit 408 derives, for example, the arithmetic mean value of these plural movement speeds as the movement speed of the object which is targeted (the object being targeted). The movement speed derived here is the movement speed on the screen. Therefore, the proximity camera appearance time estimating unit 408 converts the movement speed on the screen into the movement speed in the real world on the basis of the height of a position, where the capturing apparatus is installed, from the ground, an angle of the capturing apparatus (the optical axis) for a horizontal plane, the focal distance of the capturing apparatus and the like. Here, in the present embodiment, it is assumed that the object moves at the same movement speed from when the object exits from the capturing range of the capturing apparatus until when the object reaches the predetermined position in the capturing range of proximity camera. Therefore, the proximity camera appearance time estimating unit 408 derives the time required in that the object appears in the proximity camera by the calculation that the distance from the capturing apparatus to the proximity camera included in the camera arrangement information is divided by the converted movement speed.

Next, the proximity camera parameter determining unit 410 determines the frame rate (capturing frame rate) of the capturing unit 301 of the proximity camera on the basis of the appearance time derived in the S608 (S609). The possibility capable of capturing the object by the proximity camera can be increased by previously increasing the frame rate of the proximity camera before that the object reaches the capturing range of the proximity camera.

As described above, in the present embodiment, the parameter to be included in the control parameter is the frame rate, and a case of increasing the frame rate of the capturing unit 301 of the proximity camera is exemplified. However, if the parameter is such the parameter, which is used for increasing at least either the frequency (number) of the images to be processed in the object identifying apparatus 105 per unit time or the image quality of the images to be processed in the object identifying apparatus 105, any parameter may be adopted. For example, any one among the frame rate, a shutter speed and an exposure time when capturing the image by the capturing unit 301 and the frame rate, a bit rate and a compression method of the image when transmitting the image by the image transmitting unit 302 can be changed.

The appearance time probability is previously stored in the appearance time probability storing unit 411, As described above, the appearance time probability is such the probability P(T) defined in that the object is captured by the proximity camera after the object appeared in the capturing range of the proximity camera at T hours later. For example, the appearance time probability can be obtained by the following method, (Refer to Kuwan-Wen, C., Chin-Chuan, L., Yi-Ping, H., Chu-Song, C. An Adaptive Learning Method for Target Tracking across Multiple Cameras (CVPR.2008). First, color histograms of the objects detected by the respective capturing apparatuses 101 to 103 during a period of the fixed time are derived before starting an operation of the capturing apparatuses after installing the capturing apparatuses 101 to 103. Next, the similarity of the objects is derived by comparing the derived color histograms of the objects with each other, then, the appearance frequency of the object every the appearance time (T) is derived by using the derived similarity of the object, and then, the appearance time probability P(T) is derived from the derived appearance frequency. The appearance time probability P(T) is derived for each combination of the two capturing apparatuses which capture the two capturing ranges where the object successively passes. The camera IDs of these two capturing apparatuses are associated with the appearance time probability P(T).

According to the appearance time probability P(T), the probability that the object, which is the same as the object detected by the capturing apparatus which currently captures the object, is captured by the proximity camera can be obtained from the appearance time (the time required in that the object appears in the proximity camera) estimated in S608. In an example illustrated in FIG. 5, the probability that the object, which is the same as the person 504 detected by the capturing apparatus 101, is captured by the capturing apparatus 102 can be obtained. A fact that the appearance time probability P(T) is the low probability means that the possibility capable of capturing the object, which is the same as the object detected by the capturing apparatus which currently captures the object, is the low possibility even if the frame rate of the proximity camera is a high frame rate. Therefore, in the present embodiment, a predetermined threshold is set for the appearance time probability P(T).

The proximity camera parameter determining unit 410 derives the appearance time probability P(T), which is such the appearance time probability P (T) corresponding to the appearance time estimated in S608, for the capturing apparatus which currently captures the object and the capturing apparatus (proximity camera) which captures the object next to that former capturing apparatus. The proximity camera parameter determining unit 410 instructs to increase the frame rate of the proximity camera when the derived appearance time probability P(T) is equal to or higher than the threshold. On the other hand, when the derived appearance time probability P(T) is not equal to or higher than the threshold, the proximity camera parameter determining unit 410 does not increase the frame rate of the proximity camera. Accordingly, the load to the network 104 can be further reduced rather than increasing the frame rate uniformly.

Incidentally, the frame rate may be always changed to the maximum value, or when the value of the appearance time probability P(T) is higher, the frame rate may be changed to more approximate the maximum value, For example, when the maximum value of the frame rate is assumed as fmax and the current frame rate is assumed as fc, the expression of (fmax−fc)×P(T) can be treated as the change value of the frame rate. Or, the passing time, which is such the time that the object passes through the capturing range of the proximity camera, is estimated from the movement speed of the object, and the frame rate may be determined so as to be able to perform the capturing predetermined number of times within the estimated passing time, For example, the distances between two entrance and exit points are derived with respect to all combinations of the entrance and exit points for the capturing range of the proximity camera, and the arithmetic mean value of the derived distances is treated as the distance required in that the object passes through the capturing range of the proximity camera. The passing time can be derived by the calculation that this distance is divided by the movement speed of the object.

In FIG. 5, it will be described by exemplifying a case that only the one person is chased. However, there is also a case that plural persons are chased, at the same time. In this case, the upper limit value of the increased amount of the frame rate may be previously set in the whole network. The increased amount of the frame rate at each of the capturing apparatuses 101 to 103 may be assigned in the order of short time of the above-described passing time within this upper limit value. That is, such the proximity camera, which is characterized in that the passing time of the object in the capturing range becomes shorter, more increases the frame rate. By processing in this manner, it can be more surely suppressed to cause a state that the object, of which the passing time in the capturing range is short, becomes unable to be chased.

Next, the control parameter transmitting unit 412 performs the first outputting process (S610). In the first outputting process, the control parameter is transmitted to the proximity camera so as to be able to perform the capturing by using the frame rate which was determined in S609. Incidentally, the control parameter is transmitted at the timing of elapsing the appearance time estimated in S608 from the current time of day or at the timing before or after a predetermined time for the above timing. Accordingly, the proximity camera can capture the object by using the frame rate determined in S609 at the time when the object appears in the capturing range.

In a case that the frame rate was increased, the load in the whole network 104 may be kept at a constant level by decreasing the resolution of the image (frame image) to be transmitted from each of the capturing apparatuses 101 to 103 to the object identifying apparatus 105.

In the proximity camera, the control parameter is received at the control parameter receiving unit 303 and the frame rate of the capturing unit 301 is changed at the parameter controlling unit 304. In a case that the frame rate when transmitting the image by the image transmitting unit 302 is included in the control parameter, the frame rate of the image transmitting unit 302 of the proximity camera is changed. Also as to other parameters, the setting of the proximity camera is changed such that at least either the frequency (number) of the images to be processed per unit time at the object identifying apparatus 105 or the image quality of the images to be processed at the object identifying apparatus 105 is increased in accordance with the contents of the parameters.

Figure 8:
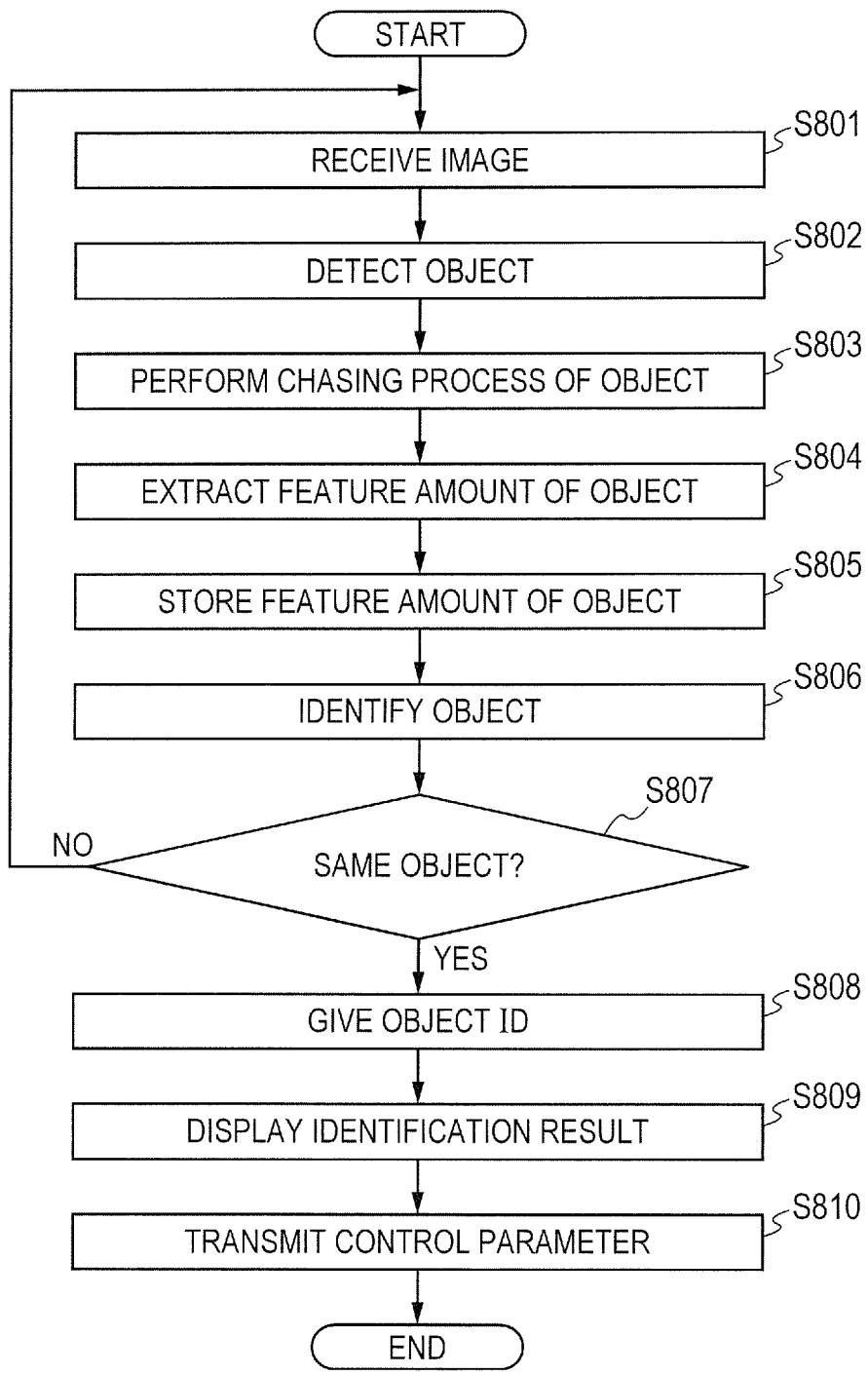
FIG. 8 is a flow chart for describing a second process of the object identifying apparatus.

Next, an example of a process to be performed in the object identifying apparatus 105 in case of identifying the person detected by a certain capturing apparatus with the person detected by the proximity camera after elapsing the appearance time will be described with reference to a flow chart of FIG. 8. In an example illustrated, in FIG. 5, the person 504 detected by the capturing apparatus 101 and the person 504 detected, by the capturing apparatus 102 are to be identified by the process in the flow chart, of FIG. 8.

Figure 6:
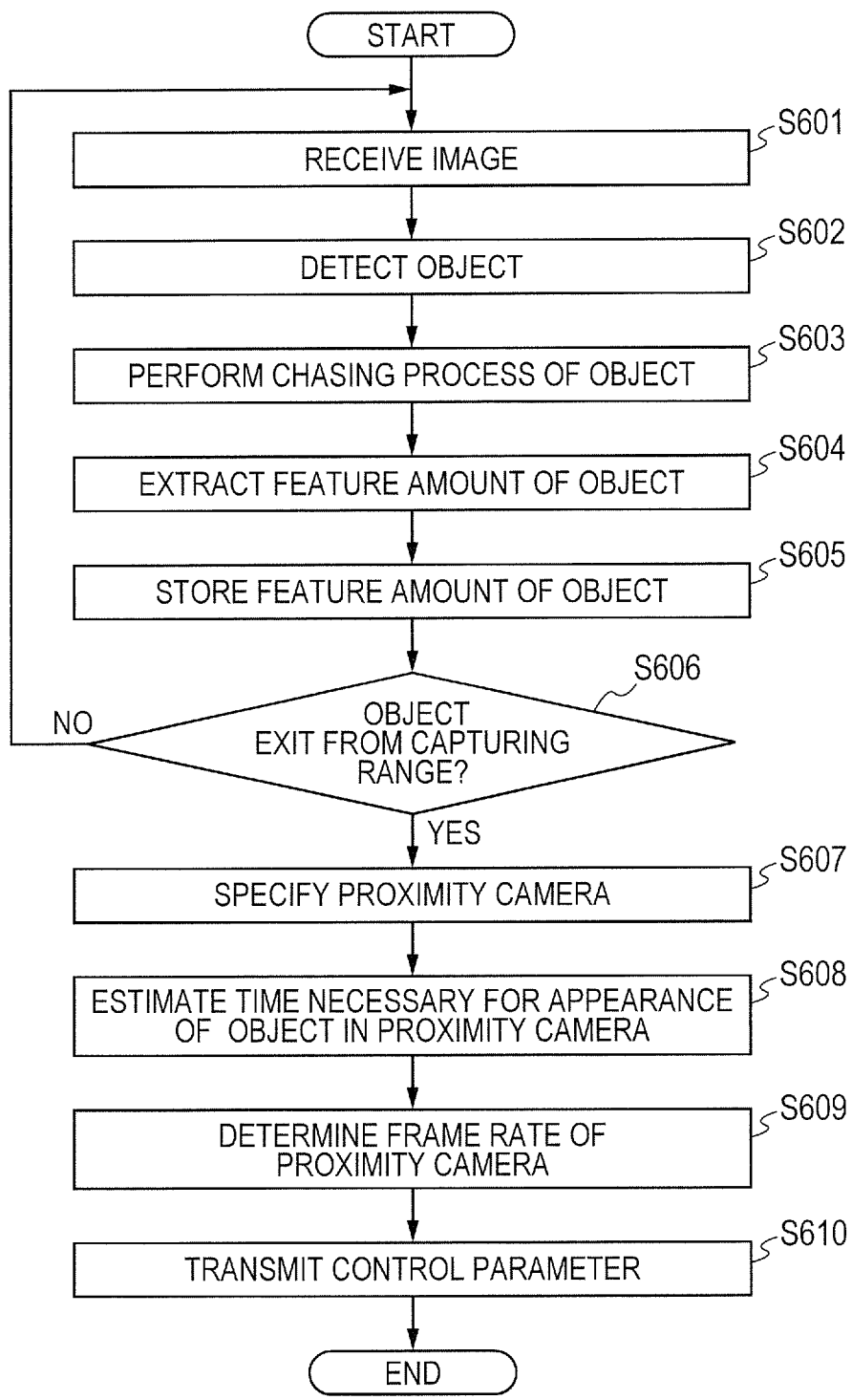
FIG. 6 is a flow chart for describing a frit process of the object identifying apparatus.

Since the processes in S801 to S805 are respectively the same as the processes in S601 to S605 of FIG. 6, the detailed description thereof will be omitted. Note that the image to be received in S801 is to become the image captured by the frame rate which was determined in the flow chart of FIG. 6.

When the process in S805 is terminated, the object identifying unit 406 reads out the feature amount of the object in the capturing apparatus currently targeted to perform the process and the feature amount of the object in the capturing apparatus, which is one previous of the above capturing apparatus, targeted to perform the process from the object feature storing unit 405. Then, the object identifying unit 406 identifies the object (S806) by deriving the distance between the objects of the read-out feature amounts of the objects. As for the distance between the objects, for example, the Euclidean distance can be used. In addition to this, the distance between the objects can be derived by such a method of previously learning the Mahalanobis distance as described, in the above-described literature "Towards Person Identification and Re-Identification With Attributes". In this manner, the object identifying process in S806 is performed for a combination of the capturing apparatus currently targeted to perform the process (the capturing apparatus 102 in FIG. 5) and the capturing apparatus, which is one previous of the above capturing apparatus, targeted to perform the process (the capturing apparatus 101 in FIG. 5) in the object identifying apparatus 105. The camera ID of the capturing apparatus, which is one previous of the above capturing apparatus, targeted to perform the process can be obtained from the proximity camera ID corresponding to the entrance and exit points, where the object passed when the object entered in the capturing range of the capturing apparatus targeted to perform the process. As described above, the proximity camera ID corresponding to the each entrance and exit points ID is included in the camera arrangement information stored in the camera arrangement information storing unit 409.

Next, the object identifying unit 406 decides (or determines) whether or not the objects to be captured are the same object between the above-described two capturing apparatuses (S807).

For example, the object identifying unit 406 can decide whether or not the objects to be captured are the same object between the above-described two capturing apparatuses by comparing the distance between the objects derived in S806 with the predetermined threshold. If the distance between the objects derived in S806 is within the threshold, the object identifying unit 406 decides that the objects to be captured are the same object between the above-described two capturing apparatuses. On the other hand, if the distance between the objects derived in S806 is not within the threshold, the object identifying unit 406 decides that the objects to be captured are not the same object between the above-described two capturing apparatuses.

As a result of this decision, if the objects to be captured are the same object between the above-described two capturing apparatuses, the object identifying unit 406 performs the following process. That is, the object identifying apparatus 406 gives the ID, which is the same as the object ID given to the feature amount of the object obtained, from the image captured by the one previous capturing apparatus targeted to perform the process, to the feature amount of the object obtained from the image captured by the capturing apparatus currently targeted to perform the process. Accordingly, the feature amount of the object obtained from the image captured by the capturing apparatus currently targeted to perform the process and the object ID are mutually associated with each other and stored in the object, feature storing unit 405 (S808).

Next, the outputting unit 407 displays a result that the object was identified (S809). For example, the outputting unit 407 displays the result by adding the object ID 514 to the image which was transmitted from the capturing apparatus as illustrated in FIG. 5. Or, the outputting unit 407 may display the rectangular object area 513 having different color for each the object ID. Any display may be performed as a result that the object was identified, if it is such a method, where a user can recognize that the same object is included in which the position of the image which was captured by which the capturing apparatus.

Further, the outputting unit 407 may display route information, which indicates that the specified, object passed, the capturing range of which the capturing apparatus, including information of the object ID, the camera ID and a passing time of day.

In addition, the outputting unit 407 may output (store) information used, for performing the above-described display to a storage medium or an external device in addition to or instead of the above-described display. In such a case, the above-described display can be performed when a user requests such the display. In addition, the above-described route information may be superimposingly displayed on a camera layout drawing or the like as illustrated in the upper illustration of FIG. 5.

Next, the control parameter transmitting unit 412 performs the second outputting process (S810). In the second outputting process, the control parameter is transmitted such that the frame rate of the capturing apparatus currently targeted to perform the process becomes the original frame rate before it was changed with reference to the camera arrangement information stored in the camera arrangement information storing unit 409. This second outputting process is performed in order that the load to the network 104, which is temporarily increased, is rapidly returned to the former state, since it can be confirmed that the object which is captured by the capturing apparatus currently targeted to perform the process is the same as the object which was captured by the one previous capturing apparatus targeted to perform the process. In order to more improve visibility of a user, the frame rate of the capturing apparatus may be returned to the original frame rate before it was changed at the time when the targeted object exited from the capturing range of the capturing apparatus currently targeted to perform the process. If the frame rate is maintained to be decreased, the frame rate is not always returned to the original frame rate before it was changed.

As described above, in the present embodiment, the frame rate of the capturing apparatus 102 (proximity camera) is increased in accordance with the timing that the person 504 targeted to be captured by the capturing apparatus 101 is captured by the capturing apparatus 102 which captures the object next to the capturing apparatus 101. Therefore, the frame rate of each of the capturing apparatuses 101 to 103 is not always required to be maintained at a high level. Accordingly, it can be suppressed to deteriorate the accuracy in identifying the same person 504 captured by the plural capturing apparatuses 101 to 103 connected via the network 104 and increase the load in the network 104.

In the present embodiment, the proximity camera is specified on the basis of the position (entrance and exit points) of the person 504, who is targeted to be captured by the capturing apparatus 101, in the screen. Therefore, even when the passing order of the object in the capturing ranges of the plural capturing apparatuses 101 to 103 is not determined as one order, the frame rate of the proximity camera can be increased.

Like this, in a case that the passing order of the object in the capturing ranges of the plural capturing apparatuses 101 to 103 is not determined as one order, it is preferable to specify the proximity camera on the basis of the position (entrance and exit points) of the person 504, who is targeted to be captured by the capturing apparatus 101, in the screen. However, when the passing order of the object in the capturing ranges of the plural capturing apparatuses 101 to 103 is determined as one order, such the specifying process of the proximity camera may not be performed.

In the present embodiment, the frame rate of the capturing apparatus 102 is decreased after deciding that the person included in the image which was captured by the capturing apparatus 102 targeted to perform the process is the same as the person included in the image which, was captured by the one previous capturing apparatus 101 targeted to perform the process. Therefore, the frame rate can be temporarily increased during a period required to chase the object. Accordingly, it can be more suppressed to increase the load in the network 104.

In the present embodiment, the time (appearance time) required in that the object appears in the proximity camera is derived and then the appearance time probability, which is such the probability that the object is captured by the proximity camera at the appearance time, is derived. Then, when the appearance time probability is equal to or higher than the threshold, the frame rate of the proximity camera is increased. Therefore, only when the probability that the object is captured by the proximity camera is at a high level, the frame rate of the proximity camera can be increased. Accordingly, it can be more suppressed to increase the load in the network 104.

In the present embodiment, it has been described by mainly treating such an example, where the capturing apparatus predicted to capture the object next to the capturing apparatus currently captures the object is treated as the "proximity camera". However, such a case, where the capturing apparatus predicted to capture the object after next to the capturing apparatus currently captures the object is treated as the "proximity camera" and then the object is identified by controlling the frame rate or the like, is also considered according to the installing condition of the capturing apparatus or a moving route of the object. That is, the object identifying apparatus 105 of the present embodiment can also decide whether or not the object included in the image which was captured by the first capturing apparatus is the same as the object included in the image which was captured by the second capturing apparatus which captures the object after the first capturing apparatus.

Note that any of the above-described embodiments is only a case of indicating an example embodied in conducting the present invention, and a technical scope of the present invention must not be limitedly interpreted by the embodiments. That is, the present invention can be conducted in various manners without deviating from the technical ideas or the main feature of the invention.

Other Embodiments

Embodiment(s) of the present invention can also be realized by a computer of a system or apparatus that reads out and executes computer executable instructions (e.g., one or more programs) recorded, on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard, disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited, to the disclosed exemplary embodiments. The scope of the following claims is to be accorded the broadest interpretation so as to encompass all such modifications and equivalent structures and functions.

This application claims the benefit of Japanese Patent Application No. 2015-043872, filed Mar. 5, 2015, which is hereby incorporated by reference wherein in its entirety.

What is claimed is:

1. An information processing apparatus comprising:
one or more processors; and
a memory coupled to the one or more processors, the memory having stored thereon instructions which, when executed by the one or more processors, cause the information processing apparatus to:
identify an object captured by a first capturing apparatus;
specify a second capturing apparatus which may capture the object identified by the first capturing apparatus;
estimate a time that the object captured by the first capturing apparatus appears in an image captured by the specified second capturing apparatus; and
output, to the specified second capturing apparatus, an output instruction for raising at least either one of a capturing frame rate or an image quality of the specified second capturing apparatus to determine whether the object identified by the first capturing apparatus appears in the image captured by the specified second capturing apparatus,
wherein the output instruction is an instruction for raising at least either one of the capturing frame rate or the image quality of the specified second capturing apparatus at timing based on the estimated time.

2. The information processing apparatus according to claim 1, wherein in specifying the second capturing apparatus, the instructions, when executed by the one or more processors, cause the information processing apparatus to specify the second capturing apparatus from among plural capturing apparatuses, according to a position of the object included in the image captured by the first capturing apparatus.

3. The information processing apparatus according to claim 1, wherein the instructions, when executed by the one or more processors, further cause the information processing apparatus to:
estimate a time required for the object included in the image captured by the first capturing apparatus to appear in the image captured by the specified second capturing apparatus;
determine a timing of outputting the instruction based on the estimated time; and
output the instruction at the determined timing.

4. The information processing apparatus according to claim 3, wherein the instructions, when executed by the one or more processors, further cause the information processing apparatus to estimate the time, on the basis of positions of the first capturing apparatus and the specified second capturing apparatus and a movement speed, in the image, of the object included in said image captured by the first capturing apparatus.

5. The information processing apparatus according to claim 3, the instructions, when executed by the one or more processors, further cause the information processing apparatus to: derive a probability that the object included in the image captured by the first capturing apparatus appears in the image captured by the specified second capturing apparatus, in the estimated time; and
in a case where the derived probability is equal to or higher than a threshold, output the instruction.

6. The information processing apparatus according to claim 1, the instructions, when executed by the one or more processors, further cause the information processing apparatus to output, to the specified second capturing apparatus, an instruction for lowering the capturing frame rate or the image quality instructed to be raised, after deciding that the object included in the image captured by the first capturing apparatus is the same as the object included in the image captured by the specified second capturing apparatus.

7. An information processing method, comprising:
identifying an object captured by a first capturing apparatus;
specifying a second capturing apparatus which may capture the object identified by the first capturing apparatus;
estimating a time that the object captured by the first capturing apparatus appears in an image captured by the specified second capturing apparatus; and
outputting, to the specified second capturing apparatus, an output instruction for raising at least either one of a capturing frame rate or an image quality of the specified second capturing apparatus to determine whether the object identified by the first capturing apparatus appears in the image captured by the specified second capturing apparatus,
wherein the output instruction is an instruction for raising at least either one of the capturing frame rate or the image quality of the specified second capturing apparatus at timing based on the estimated time.

8. A non-transitory computer-readable storage medium which stores a program for, by being read and executed by a computer, causing the computer to function as a three-dimensional coordinate measuring apparatus, the computer executing the program to execute a method comprising:
identifying an object captured by a first capturing apparatus;
specifying a second capturing apparatus which may capture the object identified by the first capturing apparatus;
estimating a time that the object captured by the first capturing apparatus appears in an image captured by the specified second capturing apparatus; and
outputting, to the specified second capturing apparatus, an output instruction for raising at least either one of a capturing frame rate or an image quality of the second capturing apparatus to determine whether the object identified by the first capturing apparatus appears in the image captured by the specified second capturing apparatus,
wherein the output instruction is an instruction for raising at least either one of the capturing frame rate or the image quality of the specified second capturing apparatus at timing based on the estimated time.

* * * * *